(12) United States Patent
Gerstenberger et al.

(10) Patent No.: US 9,998,920 B2
(45) Date of Patent: Jun. 12, 2018

(54) METHODS AND APPARATUSES FOR ACTIVATING A SUBSCRIPTION FOR COMMUNICATION OVER A MOBILE RADIO NETWORK

(71) Applicant: GIESECKE & DEVRIENT GMBH, München (DE)

(72) Inventors: Volker Gerstenberger, Erding (DE); Andreas Morawietz, München (DE); Nils Nitsch, Markt Schwaben (DE); Olaf Schneider, München (DE); Tom Weber, Buchloe (DE)

(73) Assignee: GIESECKE+DEVRIENT MOBILE SECURITY GMBH, Munich (DE)

(*) Notice: Subject to any disclaimer, the term of this patent is extended or adjusted under 35 U.S.C. 154(b) by 71 days.

(21) Appl. No.: 15/105,124

(22) PCT Filed: Dec. 17, 2014

(86) PCT No.: PCT/EP2014/003404
§ 371 (c)(1),
(2) Date: Jun. 16, 2016

(87) PCT Pub. No.: WO2015/090585
PCT Pub. Date: Jun. 25, 2015

(65) Prior Publication Data
US 2016/0323743 A1    Nov. 3, 2016

(30) Foreign Application Priority Data
Dec. 20, 2013  (DE) .................. 10 2013 021 967

(51) Int. Cl.
*H04W 12/06* (2009.01)
*H04L 29/06* (2006.01)
(Continued)

(52) U.S. Cl.
CPC ......... *H04W 12/06* (2013.01); *H04L 63/0853* (2013.01); *H04L 67/04* (2013.01);
(Continued)

(58) Field of Classification Search
CPC ......... H04W 12/06; H04W 4/00; H04W 4/02; H04L 29/08; H02L 29/08; H02L 29/06
(Continued)

(56) References Cited

U.S. PATENT DOCUMENTS

2006/0183500 A1    8/2006  Choi
2011/0294472 A1*  12/2011  Bramwell ............... H04W 8/04
                                                                455/413
(Continued)

FOREIGN PATENT DOCUMENTS

EP          1768316 A2    3/2007

OTHER PUBLICATIONS

"White Paper—Dynamic SIM Allocation," Evolving Systems, Mar. 9, 2012, pp. 1-33, URL:http://www.gsma.com/membership/wp-content/uploads/2012/03/Dynamic_SIM_Allocation_Solution_Overview_WP.pdf.
(Continued)

*Primary Examiner* — Kamran Afshar
*Assistant Examiner* — Farid Seyedvosoghi
(74) *Attorney, Agent, or Firm* — Workman Nydegger

(57) ABSTRACT

A method is provided for activating a subscription on a security element which is part of a mobile end device, and is insertable or permanently installed therein. The method comprises the following steps: receiving a request from the security element by a mobile radio system to communicate over a mobile radio network of the mobile radio system; establishing the position of the mobile end device; and checking by the mobile radio system whether the established position of the mobile end device falls within a predefined (Continued)

range of allowed positions, wherein the subscription on the security element is activated and thereby the security element enabled to communicate over the mobile radio network if the established position of the mobile end device falls within the predefined range of allowed positions.

11 Claims, 3 Drawing Sheets

(51) Int. Cl.
    *H04W 8/18*     (2009.01)
    *H04W 48/04*     (2009.01)
    *H04L 29/08*     (2006.01)
    *H04W 4/02*     (2018.01)
    *H04W 64/00*     (2009.01)

(52) U.S. Cl.
    CPC ............ *H04L 67/18* (2013.01); *H04W 4/025* (2013.01); *H04W 4/70* (2018.02); *H04W 8/183* (2013.01); *H04W 48/04* (2013.01); *H04W 4/02* (2013.01); *H04W 64/00* (2013.01)

(58) Field of Classification Search
    USPC .................................................. 455/411, 558
    See application file for complete search history.

(56) References Cited

U.S. PATENT DOCUMENTS

| | | | |
|---|---|---|---|
| 2012/0077496 A1* | 3/2012 | Mathias | ................. G06Q 30/06 455/435.1 |
| 2012/0184274 A1 | 7/2012 | Lopresti et al. | |
| 2013/0165073 A1 | 6/2013 | Madsen | |
| 2013/0281085 A1 | 10/2013 | Sen et al. | |
| 2013/0344857 A1* | 12/2013 | Berionne | .............. H04W 88/02 455/418 |
| 2013/0344864 A1 | 12/2013 | Park et al. | |

OTHER PUBLICATIONS

German Search Report from corresponding German Application No. DE 10 2013 021 967.1, dated Jan. 10, 2014.
International Search Report from corresponding PCT Application No. PCT/EP2014/003404, dated Mar. 9, 2015.

\* cited by examiner

METHODS AND APPARATUSES FOR ACTIVATING A SUBSCRIPTION FOR COMMUNICATION OVER A MOBILE RADIO NETWORK

FIELD OF THE INVENTION

This invention concerns communication over mobile radio networks in general and, in particular, methods and apparatuses for employing and in particular activating a subscription on a security element, such as a SIM, an eUICC/UICC, or the like. The security element here is part of a mobile end device which is configured for communicating over a mobile radio network.

BACKGROUND OF THE INVENTION

Communicating by means of a mobile end device, for example a mobile telephone, over a mobile radio network (also designated as a PLMN [Public Land Mobile Network]) which is operated by a network operator (also designated as an MNO [Mobile Network Operator]) as a rule requires that the mobile end device is equipped with a security element for securely storing data that uniquely identify the user of the mobile end device vis-à-vis the mobile radio network. For example, in a mobile end device that is configured for communicating according to the GSM standard (Global System for Mobile Communications), which is currently the most widespread mobile radio standard in the world, there is used a security element with the name SIM (Subscriber Identity Module) usually in the form of a chip card or smart card. According to the GSM standard, whose technical features are defined in a plurality of mutually linked and interdependent specifications, the SIM card contains subscriber identification data or subscription authorization data ("Subscription Credentials") which are part of a subscription (also called the subscription profile), for identifying and authenticating the user or subscriber, including an IMSI (International Mobile Subscriber Identity) and an authentication key $K_i$.

An area of application of security elements, such as SIM cards, UICCs, eUICCS, and the like, that in all probability will grow substantially during the coming years is M2M communication ("machine-to-machine communication"), i.e. communication between machines over a mobile radio network without human interaction, for which the designation "Internet of Things" is also employed. In M2M communication, data can be automatically exchanged between numerous different kinds of machines that are equipped with a security element in the form, or as part, of an M2M module, for example TV systems, set-top boxes, vending machines, vehicles, traffic lights, surveillance cameras, sensor apparatuses, electricity meters and similar M2M apparatuses, with the M2M module or security element being as a rule permanently installed in a respective M2M apparatus. With a security element that is part of an M2M module or configured as such a module, a subscription with subscription authorization data must also as a rule be present on the security element in order that the latter can identify and authenticate itself vis-à-vis a mobile radio network and therefore communicate over the mobile radio network.

Upon the manufacture of a security element for a mobile end device or an M2M apparatus, the subscription authorization data are usually deposited on the security element as part of a subscription by the manufacturer of the security element or the network operator within the context of a personalization process. In this procedure, the corresponding subscription is as a rule immediately "active", i.e. can be employed for communication over a mobile radio network, if the subscription authorization data, for example an IMSI, are also deposited in the corresponding mobile radio network. When an M2M apparatus with such an active subscription is delivered to a customer, the problem can arise that if the M2M apparatus is stolen, goes missing or is otherwise lost on the way to the customer, the active subscription of the M2M apparatus nevertheless enables communication over a mobile radio network, which as a rule cannot be in the interests of the customer and/or the manufacturer of the M2M apparatus.

Against this background, the present invention is faced with the object of proposing improved methods and apparatuses for employing a subscription on a security element that are able to at least partly remedy the hereinabove described disadvantage.

SUMMARY OF THE INVENTION

According to a first aspect of the invention, there is provided a method for activating a subscription on a security element which is part of a mobile end device, being insertable or permanently installed therein. The method comprises the following steps: receiving a request from the security element by a mobile radio system to communicate over a mobile radio network of the mobile radio system; establishing the position of the mobile end device; and checking by the mobile radio system whether the established position of the mobile end device falls within a predefined range of allowed positions, wherein the subscription on the security element is activated and the security element thereby enabled to communicate over the mobile radio network if the established position of the mobile end device falls within the predefined range of allowed positions.

Preferably, before the step of receiving the request the security element logs in to the mobile radio network or a background system of the mobile radio system with the subscription to be activated.

According to preferred embodiments of the invention, before the step of receiving a request the security element logs in to the mobile radio system with a provisional subscription, and after the checking step the subscription to be activated is downloaded to the security element from the background system.

Preferably, the method comprises the following further step after the checking step: if the established position of the mobile end device falls within the predefined range of allowed positions, changing settings in the mobile radio system such that no further check of the position of the mobile end device is effected upon further log-ins of the security element to the mobile radio system with the released subscription.

According to preferred embodiments of the invention, the subscription on the security element is not released if the established position of the mobile end device does not fall within the predefined range of allowed positions. Preferably, the position of the mobile end device is established by means of data from a global navigation satellite system, e.g. GPS data. Alternatively or additionally, the position of the mobile end device is established by determining the mobile radio cell in which the mobile end device is located.

Preferably, the step of checking whether the established position of the mobile end device falls within a predefined range of allowed positions is carried out by the mobile radio network or the background system. The range of allowed positions is preferably predefined by data which are deposited on the background system.

According to a second aspect of the invention, there is supplied a security element which is part of a mobile end device, being insertable or permanently installed therein, and is configured for being furnished with an activated subscription by a method according to the first aspect of the invention in order to be able to communicate over the mobile radio network.

A security element according to the invention is for example a data carrier configured in hardware. The security element is for example arranged in a mobile end device as a permanently integrated part, whereby it either in this form cannot be removed from the end device, for example as a subscriber identification module, M2M module, coprocessor, Trusted Base, Trusted Platform Module. Alternatively, the security element is connected to the mobile end device as a removable module, for example as a chip card, in particular as a subscriber identification module, smart card, mass memory card, USB token, MultiMediaCard, secure MicroSD card, mobile radio network token, e.g. a UMTS Internet stick, and/or as an electronic identity document, for example as an electronic identity card or passport, with a person's machine-readable identification data deposited in a memory area.

According to a further alternative, the security element can be configured as a combination of hardware and software components in a trustworthy part of an operating system of the end device, which is also known to the skilled person as a secure runtime environment ("Trusted Execution Environment"; TEE). The security element can then be configured for example within such a secure runtime environment in the form of programs running therein, so-called Trustlets®.

As the skilled person will recognize, the hereinabove described preferred embodiments can be advantageously implemented both within the context of the first aspect of the invention, i.e. within the context of the method for activating a subscription, and within the context of the second aspect of the invention, i.e. within the context of a security element having a subscription activated according to the first aspect of the invention.

BRIEF DESCRIPTION OF THE DRAWINGS

Further features, advantages and objects of the invention will emerge from the following detailed description of several embodiment examples and embodiment alternatives. Reference is made to the drawings, in which there are shown.

DETAILED DESCRIPTION OF VARIOUS EMBODIMENTS

Figure 1:
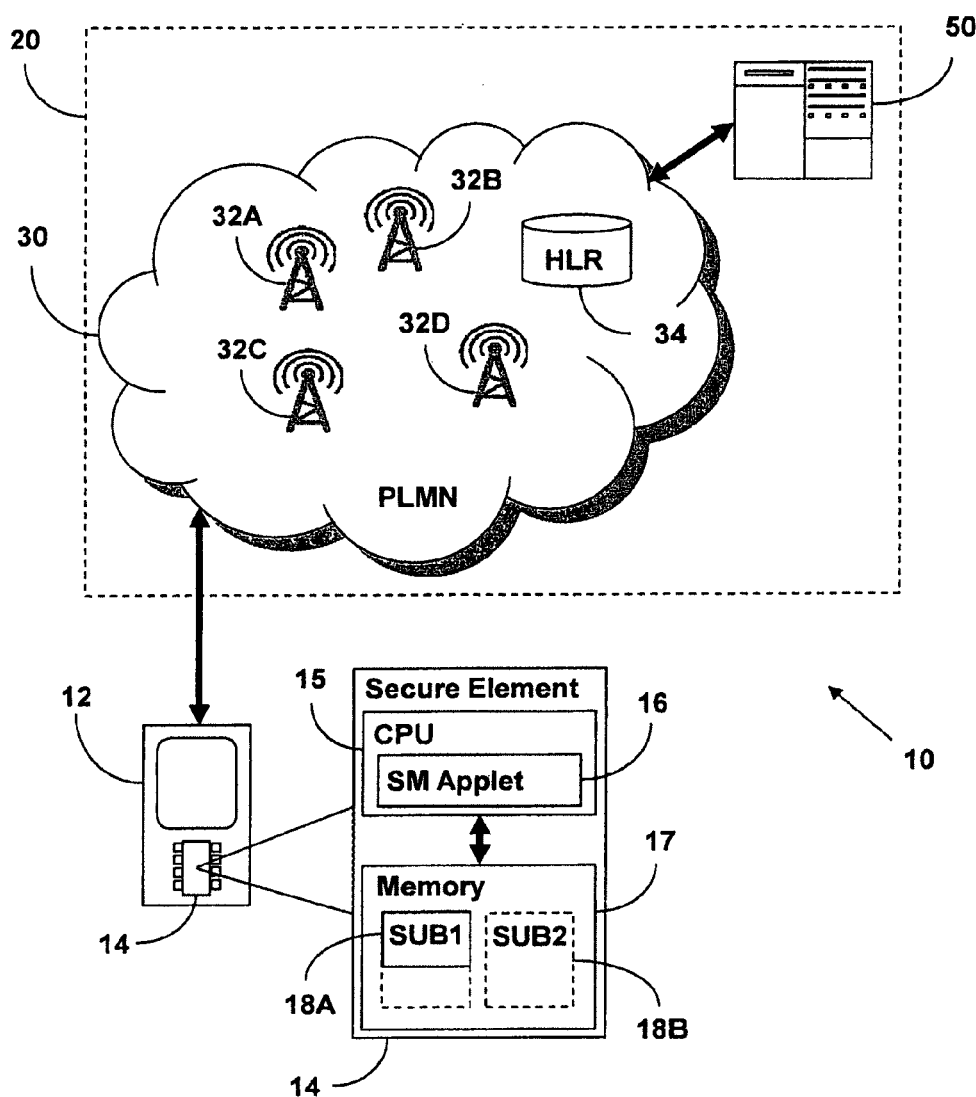
FIG. 1 a schematic representation of a communication system having a mobile end device having a security element and a mobile radio system, which illustrates different aspects of the present invention, FIG. 2 a schematic representation of a sequence that is preferred according to the invention for employing and activating a subscription on the security element of the mobile end device of FIG. 1, and FIG. 3 an exemplary schematic illustration of a range of positions of the mobile end device of FIG. 1 that are allowed for activation, and a range of positions not allowed for activation.

FIG. 1 shows a schematic representation of the components of a communication system 10 and some of the communication connections between said components, which illustrates different aspects of the present invention. Although reference will be made to a "mobile" end device in the following detailed description, the skilled person will recognize that the present invention can be implemented advantageously in connection with every kind of end device that is configured for communicating over a mobile or cellular communication network, i.e. also with end devices whose location practically does not change. In other words, the herein employed attribute "mobile" relates to the ability of the end device to communicate over a mobile or cellular communication network, including IP-based mobile communication networks, for which the term "mobile radio network" will hereinafter be employed in general.

An exemplary mobile end device 12 is represented in FIG. 1, comprising a security element ("Secure Element") 14 for securely storing and processing data that for example uniquely identify the mobile end device 12 and/or its user. As indicated in FIG. 1, the mobile end device 12 is preferably a mobile telephone, a smartphone or a similar apparatus. The skilled person will recognize, however, that the mobile end device 12 according to the present invention can likewise be configured in the form of other apparatuses that are adapted for communicating over a mobile radio network, such as a tablet computer, a notebook, a TV system, a set-top box, a vending machine, a passenger car, a surveillance camera, a sensor apparatus, and comparable M2M apparatuses.

According to preferred embodiments of the invention, the security element 14 is configured as an eUICC (embedded Universal Integrated Circuit Card) with a SIM application running thereon, i.e. as a security element that is a permanent part of the mobile end device 12 and is employed in a mobile radio network for uniquely and securely identifying the user and for supplying different functions and value-added services. Alternatively, the security element 14 can be configured as a UICC (Universal Integrated Circuit Card) or SIM card (Subscriber Identity Module) which is known to the skilled person as one of the currently most frequently employed forms of security element. The skilled person will recognize, however, that other kinds of security elements which are designated as USIM, R-UIM, ISIM, and the like, depending on the generation and type of underlying mobile radio communication system standard, are likewise embraced by the present invention. Further, the security element 14 may be an M2M module, or the security element 14 may be part of such an M2M module.

According to further preferred embodiments of the invention, the security element 14 can be configured as a combination of hardware and software components in a trustworthy part of an operating system of a central processing unit of the mobile end device 12, which is also known to the skilled person as a secure runtime environment ("Trusted Execution Environment"; TEE). The security element 14 can then be configured for example within such a secure runtime environment of the mobile end device 12 in the form of programs running therein, so-called Trustlets®.

The mobile end device 12 is configured for communicating via the over-the-air interface with a mobile radio system 20 which comprises at least one mobile radio network 30 (also designated as a "Public Land Mobile Network" [PLMN]) and a background system 50, preferably in the form of a suitably configured server. The PLMN 30 is usually operated by a mobile network operator (also designated as a "Mobile Network Operator" or MNO). According to preferred embodiments of the invention, the PLMN 30 is operated according to the GSM standard ("Global Standard for Mobile Communications").

Hereinafter some preferred embodiments of the invention will be described in connection with a mobile radio network as part of the mobile radio system 20 according to the GSM standard, which is specified in a plurality of ETSI specifications. The skilled person will recognize, however, that the present invention can also be used advantageously in connection with other mobile radio networks. Such networks comprise mobile radio networks of the third generation (3GPP), such as UMTS (Universal Mobile Telecommunications System), mobile radio networks of the fourth generation (4G), such as LTE (Long Term Evolution), and other mobile radio networks, such as CDMA, and the like.

As is known to the skilled person, a mobile radio network or PLMN constructed according to the GSM standard generally comprises a BSS ("Base Station Subsystem") which consists of a plurality of BTSs ("Base Transceiver Stations") which define respective radio cells of the PLMN and are connected to a BSC ("Base Station Controller"). Usually, the BSC is one of a plurality of BSCs which communicate with a common MSC ("Mobile Switching Center"). Frequently, a local database, which is called the VLR ("Visitor Location Register"), is part of the MSC in order to hold information available about the mobile radio subscribers who are located at the moment in the radio cells that are served by an MSC (i.e. the range covered by an MSC). The MSC supplies substantially the same functionality as a switching center in a fixed-line network (public-switched telephone network; PSTN) and is in communication with an HLR ("Home Location Register"), which is the PLMN's primary database storing information for logging in or authentication of the mobile radio subscribers. For this purpose, the HLR usually has access to an AUC ("Authentication Center"). As is known to the skilled person, the communication connections between the hereinabove described components of a PLMN can be based on proprietary and/or open standards. The employed protocols can be for example SS7- or IP-based. How the network components are configured as separate or combined units and how the interfaces between said components are configured is up to the MNO, so that the hereinabove description is merely to be understood as exemplary.

The skilled person will recognize that, although the hereinabove described functional units of a conventional mobile radio network according to the GSM standard can have other names in other or future mobile radio standards, the basic principles are substantially the same and they are hence likewise embraced by the invention.

For clarity's sake, the schematic representation of FIG. 1 shows, of the hereinabove described components of a PLMN, merely the following: four exemplary BTSs, namely the BTSs 32A-D respectively defining a radio cell of the PLMN 30, and an HLR 34 for the PLMN 30. As indicated by FIG. 1, the PLMN 30 is in communication at least at times with the background system 50, preferably in the form of a suitably configured server, as to be described hereinafter in detail. The PLMN 30 might have, besides further functional units known to the skilled person, for example an SMS-C ("Short Message Service Center") for storing, relaying, converting and delivering SMS messages, by means of which for example data from the background system 50 can be transferred to the security element 14 of the mobile end device 12.

As indicated by the enlarged view of the security element 14 in FIG. 1, the security element 14 preferably comprises a central processing unit or a central processor (CPU) 15.

Preferably, the processor 15 is equipped such that applications can be executed on the processor 15, such as a subscription management application ("SM applet") which preferably supplies at least some of the features for managing and activating subscriptions on the security element 14, as to be described in detail hereinafter in connection with FIG. 2. Preferably, the subscription management application 16 is implemented in the form of a Java applet. For supplying a corresponding runtime environment for the SM applet 16, a secure operating system (not shown in FIG. 1) can preferably be implemented on the processor 15.

The security element 14 preferably further comprises a memory unit 17 which is preferably implemented as a non-volatile, rewritable memory unit, e.g. in the form of a flash memory. As indicated by FIG. 1, a subscription 18A is stored in the memory unit 17 of the security element 14. Preferably, the subscription 18A contains data that enable the security element 14 and the mobile end device 12 to log into the PLMN 30, i.e. data, such as subscription authorization data ("Subscription Credentials"), an MNO-specific authentication algorithm, and the like. Preferably, at least parts of the memory unit 17 of the security element 14 are configured for securely storing the data therein, for example sensitive subscription authorization data, such as an IMSI ("International Mobile Subscriber Identity") or an authentication key $K_i$, which are part of the subscription 18A.

As indicated in FIG. 1, the memory unit 17 can preferably supply at least one further slot for accommodating additional subscriptions, for example for accommodating the further subscription 18B represented in FIG. 1.

Preferably, the subscription 18A is stored in the memory unit 17 of the security element 14 during the manufacture and/or personalization of the mobile end device 12 and/or the security element 14. In particular in connection with this preferred embodiment, it may be provided in variants according to the invention that the subscription 18A is merely a provisional subscription which only supplies basic services that enable the security element 14 and the mobile end device 12 to communicate with the background system 50 over the PLMN 30 and to download from the background system 50 a complete subscription which supplies additional services, such as the subscription 18B represented in FIG. 1. Since a provisional subscription, such as the subscription 18A represented in FIG. 1, generally supplies merely a restricted functionality, the user of the mobile end device 12 is prompted to change to a complete subscription enabling additional services, like the subscription 18B represented in FIG. 1.

The manner of functioning of the background system 50 in connection with the other elements of the communication system 10 represented in FIG. 1 upon the first attempt of the mobile end device 12 to log into the PLMN 30 will now be described in connection with a preferred embodiment of the invention with further reference to FIG. 2.

Figure 2:
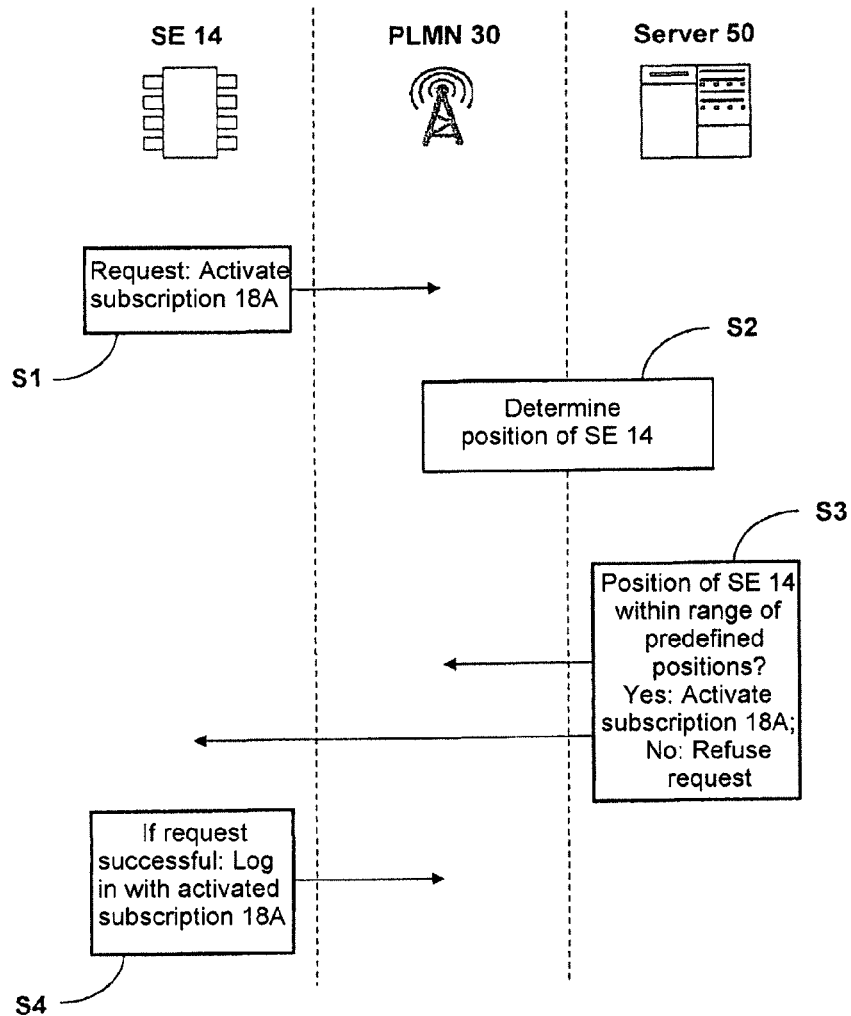

In a first step S1 of FIG. 2, the mobile end device 12 with the security element 14 indicates to the mobile radio system 20 that it wants to communicate over the PLMN 30 preferably by means of the subscription 18A already present on the security element 14. Preferably, the mobile end device 12 for this purpose sends, preferably over the PLMN 30, a corresponding request which is preferably relayed to the background system 50.

Thereupon, in a step S2 of FIG. 2, the current position of the mobile end device 12 or of the security element 14 is determined. The determination of the position of the mobile end device 12 can preferably be effected through the PLMN 30 and/or the background system 50.

According to a preferred embodiment of the invention, the mobile end device 12 is equipped with a GPS module or with a module for another global navigation satellite system, which is configured for delivering data by which the current position of the mobile end device 12 can be determined. Alternatively or additionally, the current position of the mobile end device 12 can be determined on the basis of the radio cell of the mobile radio network 30 in which the mobile end device 12 is located. As hereinabove described, a radio cell of the PLMN 30 is defined as a rule by a BTS, for example the exemplary BTSs 32A-D represented in FIG. 1.

According to preferred embodiments of the invention, the data allowing the PLMN 30 and/or the background system 50 to determine the current position of the mobile end device 12 or security element 14 can already be contained in the request of step S1 of FIG. 2. Alternatively or additionally, said data can be established, or queried from the mobile end device 12 or security element 14, by the PLMN 30 and/or the background system 50 after the request in step S1 of FIG. 2.

After the current position of the mobile end device 12 or security element 14 has been determined in step S2 of FIG. 2, it is checked in a step S3 of FIG. 2 whether the current position of the mobile end device 12 or security element 14 that was determined in step S2 falls within a range of predefined allowed positions. Preferably, a corresponding data set defining the range of allowed positions is deposited for the subscription 18A in the background system 50.

If the check in step S3 of FIG. 2 yields that the current position of the mobile end device 12 or security element 14 determined in step S2 of FIG. 2 falls within the range of allowed positions deposited for the subscription 18A, the mobile end device 12 with the security element 14 is enabled to communicate over the PLMN 30 by means of the subscription 18A, i.e. the subscription 18A is activated or released. Preferably, the background system 50 for this purpose confirms to the PLMN 30 and the security element 14 in step S3 of FIG. 2 that the current position of the mobile end device 12 or security element 14 determined in step S2 of FIG. 2 falls within the range of allowed positions and the subscription 18A can therefore be activated.

Preferably, the step of activating the subscription in step S3 of FIG. 2 comprises a further step having the consequence that further attempts by the security element 14 to log into the PLMN 30 by means of the already activated subscription 18A do not involve a recheck of the position of the mobile end device 12 or security element 14. As the skilled person will recognize, this step can be brought about in many ways. For example, settings deposited in the mobile radio system 20 could for this purpose be changed such that upon further attempts by the security element 14 to log in or sign on to the PLMN 30 with the activated subscription 18A no further check of the position of the mobile end device 12 is effected. In particular, there could be maintained in the PLMN 30, preferably in its HLR with the data deposited there in connection with the subscription 18A, a flag whose state indicates whether or not the subscription 18A has already been activated.

Figure 3:
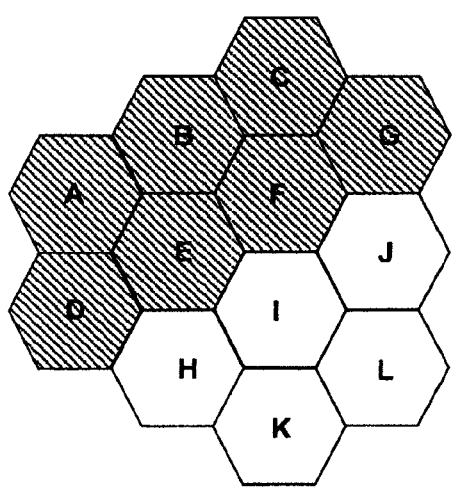

After it has been confirmed to the security element 14 by the background system 50 in step S3 of FIG. 2 that the subscription 18A has been activated, the security element 14 can log into the PLMN 30 with the activated subscription 18A in the conventional manner in step S4 of FIG. 3. As is known to the skilled person, this step as a rule involves an authentication of the security element 14 vis-à-vis the PLMN 30, for example employing an IMSI and/or an authentication key $K_i$ which are part of the activated subscription 18A.

FIG. 3 shows an exemplary schematic representation of a range of positions of the mobile end device 12 that are allowed for activation of the subscription 18A and a range of positions thereof not allowed for activation of the subscription 18A, with the two ranges being respectively defined by mobile radio cells of the PLMN 30 which cover a certain spatial area, e.g. parts of a country, an administrative district, a company's grounds, a point of sale, or the like. By way of example, a first range of said spatial area is defined by the mobile radio cells A to G (represented by hatching in FIG. 3) and a second range by the mobile radio cells H to L, with the second range representing by way of example the range of allowed positions as intended by the invention. In this case, an attempt to activate the subscription 18A would only be successful if at the time of the corresponding request the mobile end device 12 or the security element 14 is located in the range of allowed positions defined by the mobile radio cells H to L. If, on the other hand, the mobile end device 12 or the security element 14 is currently located in the range of unallowed positions defined by the mobile radio cells A to G upon the attempt to activate the subscription 18A, no activation of the subscription 18A is effected according to the invention.

As described hereinabove, in a variant according to the invention of the method represented in FIG. 2 and described above, the subscription 18A may be merely a provisional subscription which enables the security element 14 to communicate with the mobile radio system 20 and in particular the background system 50 of the mobile radio system 20. In principle, such a provisional subscription can substantially consist merely of an identification element with which the security element 14 can uniquely identify itself vis-à-vis the PLMN 30 or the background system 50.

According to this variant according to the invention, it is imaginable that, after the security element 14 has made contact with the background system 50 preferably over the PLMN 30, the background system 50 downloads a complete subscription to the security element 14 if a check by the background system 50 yields that the current position of the mobile end device 12 or security element falls within the predefined range of allowed positions.

As the skilled person will recognize, it is conceivable in this variant that the complete subscription downloaded from the background system 50 allows communication over a mobile radio network other than the PLMN 30. In this variant, the PLMN 30 merely supplies access to the background system 50 by means of the provisional subscription in order to download the complete subscription from there if a check by the background system 50 yields according to the invention that the current position of the mobile end device 12 or security element 14 falls within the predefined range of allowed positions. Communication by means of the complete subscription is then effected over another mobile radio network which is part of the mobile radio system 20 and for which the complete subscription contains in particular the necessary subscription authorization data.

The skilled person will further recognize that the hereinabove described step S1 of FIG. 2 is effected preferably over the PLMN 30, but not necessarily. For the invention also embraces embodiments in which the mobile end device 12 or security element 14 communicates with the background system 50 over an alternative communication channel, for example a wireless LAN or WiFi network.

The invention claimed is:

1. A method for activating a subscription on a security element which is part of a mobile end device, being insertable or permanently installed therein, wherein the method comprises the following steps:
receiving a request from the security element by a mobile radio system to communicate over a mobile radio network of the mobile radio system;
establishing the position of the mobile end device; and
checking by the mobile radio system whether the established position of the mobile end device falls within a predefined range of allowed positions;
wherein the subscription on the security element is activated and the security element is enabled to communicate over the mobile radio network if the established position of the mobile end device falls within the predefined range of allowed positions; and
after the checking step, if the established position of the mobile end device falls within the predefined range of allowed positions, changing settings in the mobile radio system such that no further check of the position of the mobile end device is effected upon further log-ins of the security element to the mobile radio system with the released subscription.

2. The method according to claim 1, wherein before the step of receiving the request the security element logs in to the mobile radio network or a background system of the mobile radio system with the subscription to be activated.

3. The method according to claim 1, wherein before the step of receiving the request the security element logs in to the mobile radio system with a provisional subscription, and after the checking step the subscription to be activated is downloaded to the security element from the background system.

4. The method according to claim 1, wherein the subscription on the security element is not activated if the established position of the mobile end device does not fall within the predefined range of allowed positions.

5. The method according to claim 1, wherein the position of the mobile end device is established by means of data from a global navigation satellite system, preferably GPS data.

6. The method according to claim 1, wherein the position of the mobile end device is established by determining the mobile radio cell in which the mobile end device is located.

7. The method according to claim 1, wherein the step of checking whether the established position of the mobile end device falls within a predefined range of allowed positions is carried out by the mobile radio network or the background system.

8. The method according to claim 7, wherein the range of allowed positions is predefined by data which are deposited on the background system.

9. A security element which is part of a mobile end device, being insertable or permanently installed therein, wherein the security element is configured for being furnished with an activated subscription by a method according to claim 1 in order to be able to communicate over the mobile radio network.

10. A mobile end device having a security element according to claim 9.

11. A communication system having a mobile radio network, a background system and a mobile end device according to claim 10.

* * * * *